United States Patent [19]

Merrett

[11] Patent Number: 5,650,073
[45] Date of Patent: Jul. 22, 1997

[54] DRY HYDRANT STRAINER WITH STRAINER HOLE PATTERN FOR ACHIEVING UNIFORM FLOW RATES

[75] Inventor: Stanley Leo Merrett, Dadeville, Ala.

[73] Assignee: Schlumberger Industries, Inc., Norcross, Ga.

[21] Appl. No.: 561,185

[22] Filed: Nov. 21, 1995

[51] Int. Cl.⁶ .................................................. B01D 35/02
[52] U.S. Cl. .................... 210/747; 210/170; 210/416.1; 210/460; 210/498; 137/236.1
[58] Field of Search ............................... 210/747, 170, 210/498, 460, 416.1, 416.2, 242.1, 449, 348; 137/236.1

[56] References Cited

U.S. PATENT DOCUMENTS

| | | | |
|---|---|---|---|
| 154,158 | 8/1874 | Spooner | 137/236.1 |
| 1,116,234 | 11/1914 | Brown | 210/460 |
| 1,371,143 | 3/1921 | Bradburn | 210/460 |
| 1,905,919 | 4/1933 | Levis | 210/460 |
| 2,249,020 | 7/1941 | McFarlin | 210/460 |
| 2,886,181 | 5/1959 | Wiedom | 210/460 |
| 3,027,901 | 4/1962 | Bottenberg et al. | 137/236.1 |
| 3,323,536 | 6/1967 | O'Connor et al. | 210/460 |
| 3,782,552 | 1/1974 | Wendell | 210/460 |
| 3,783,888 | 1/1974 | Johnson | 210/460 |
| 4,647,374 | 3/1987 | Ziaylek et al. | 210/242.1 |
| 4,700,734 | 10/1987 | McCauley | 137/236.1 |
| 4,973,403 | 11/1990 | Kozey | 210/460 |
| 4,973,405 | 11/1990 | Kozey | 210/460 |
| 5,082,013 | 1/1992 | Scheib | 137/236.1 |
| 5,257,643 | 11/1993 | Merrett | 137/236.1 |

*Primary Examiner*—Cynthia L. Nessler
*Attorney, Agent, or Firm*—Lowe, Price, LeBlanc & Becker

[57] ABSTRACT

A strainer for use with a dry hydrant having a fluid inlet comprises an inlet tube having a first end and a second end, the first end being substantially capped, and the second end being connected to the dry hydrant fluid inlet. A plurality of apertures are formed in the inlet tube and are disposed between the first end and the second end. The apertures are disposed in a substantially v-shaped pattern, whereby an apex of the substantially v-shaped pattern is spaced proximal to the second end. In one embodiment of the present invention, the apertures spaced proximal to the first end of the inlet member have diameters greater than diameters of the apertures spaced proximal to the second end of the inlet member. In operation in a dry hydrant system, the strainer provides for uniform suction zone throughout the inlet pipe, and provides uniform fluid drafting flow.

8 Claims, 2 Drawing Sheets

DRY HYDRANT STRAINER WITH STRAINER HOLE PATTERN FOR ACHIEVING UNIFORM FLOW RATES

TECHNICAL FIELD

This invention relates generally to dry hydrants, and more particularly, to a dry hydrant strainer for providing uniform suction and fluid flow throughout the strainer during operation of the dry hydrant.

BACKGROUND OF THE INVENTION

Dry hydrants are a type of fire service hydrant for use where there is no source of pressurized water. For example, in rural areas where there is no centralized water service, water for fire fighting is commonly drawn from lakes, ponds, cisterns or the like. Typically, a tanker truck will draw water from a nearby body of water using a flexible hose fitted with a strainer to prevent debris from being drawn into the hose. The tanker will then travel to the site the fire, where a pumper truck draws water from the tanker to fight the fire.

To simplify and speed up the process of pumping water from lakes and ponds or the like, many areas have installed dry hydrant systems. A dry hydrant system usually includes a length of pipe having one end disposed below the water line of a body of water and the other end disposed at or near the shoreline. In these arrangements, a length of polyvinylchloride (PVC) pipe is laid in a trench dug from the shoreline of a body of water to enable one end of the pipe to be disposed at a predetermined fixed depth in the water. The other end of the pipe is connected via a 90° elbow to a vertical standpipe. The standpipe is provided with a coupling which enables a standard fire hose to be connected to the standpipe to draw water through the dry hydrant to a tanker truck.

Typical strainers used with dry hydrants or dry hydrant piping systems consist of a pipe with uniformly sized holes drilled along its length. Such strainers either have holes drilled completely around the circumference of the pipe or only partially. Strainers with holes drilled around the complete circumference are generally positioned vertically in the lake or pond. Strainers with holes only partially around the circumference are placed horizontally in the body of water; furthermore, in such an arrangement, the holes face the bottom of the lake or pond. Both of these strainers usually contain a capped end and a suction end to which the PVC piping system is attached. Thus, when the tanker truck draws water via the coupling and PVC piping system, the water is drawn through the holes of the strainer.

In such an arrangement, the strainer must be properly positioned at the correct depth in the body of water. If placed indiscriminately, the strainer may draw debris, leaves or mud from the bottom of the pond of lake which will clog the strainer and diminish the flow of water to the tanker. For example, after a storm, the bottom area under a horizontal or vertical strainer may often be unsettled and shodden with debris. In such circumstances, or even when a strainer is haphazardously positioned in a lake, the suction created by the tanker pump may draw such debris and possibly clog the strainer, the piping system, or even ruin the pump. Such complications waste valuable time and may prevent the saving of property and lives.

In other circumstances, both the horizontal strainer and the vertical strainer may be too close to the surface of the water. Such instances commonly occur in areas with low tides, dry seasons, or periodic changes in water level, such as lakes, ponds, seas, bays, or rivers. When the water level is low and too close to the strainer, the suction created by the tanker pump often creates whirlpool vortices. Such vortices cause air to enter the strainer, which in turn causes pump cavitation, and ultimately, pump failure. This problem also impairs the ability of fire fighters to save property and lives.

The above described problems generally occur because dry hydrant strainers typically employ a uniform drill pattern and constant hole diameter. The size, location, and number of the holes creates a concentrated zone of low pressure near the suction end of the strainer. Thus, the holes near the suction end of the strainer experience high suction and high water flow rates, while those near the capped end of the strainer experience very little suction and low water flow rates. Because the high suction and high flow rates are concentrated in one area, the low pressure area and zone of accelerating water outside the strainer extend far away from the outer surface of the strainer. This phenomena dramatically increases the likelihood of whirlpool vortices and the drawing of debris. The hole design of these strainers also create uneven backflushing when reversing flow through the strainer in an attempt to remove debris.

The previous described problems associated with current dry hydrant strainers limit their range of use. Sources of available water are often full of debris and may be very shallow. Because of the above identified problems of current strainers, dry hydrants may not be used in some bodies of water. Thus, tanker trucks must travel further distances to receive water from deeper or less debris shodden waters. The previously described constraints of current dry hydrant strainers has created a need for a solution.

SUMMARY OF THE INVENTION

A primary object of the present invention is to provide a dry hydrant strainer which draws a substantially uniform fluid flow rate through the holes located along the length of the strainer.

Another object of the present invention is to provide a dry hydrant strainer which discourages the creation of whirlpool vortices and is more useful in shallow waters than previous strainers.

Another object of the present invention is to provide a dry hydrant strainer which discourages the drawing of debris to the strainer.

Still another object of the present invention is to provide a strainer which backwashes evenly when attempting to remove debris from the strainer through reverse flow.

Yet another object of the present invention is to provide a dry hydrant strainer which is readily adaptable to a dry hydrant piping system.

Another object to the present invention is to provide a method of straining fluid through a dry hydrant strainer which is safer, more reliable, and more efficient than past methods of straining.

According to the present invention, the foregoing and other objects are obtained by dry hydrant strainer that includes a hollow pipe of predetermined length with a suction end and a capped end. The pipe has a pattern of selectively sized and spaced holes located along its length. When the strainer is located in a fluid body, and the suction end is connected to a source of suction, fluid is drawn through the suction end such that a substantially uniform fluid flow rate develops through the holes located along the length of the pipe.

In accordance with another aspect of the invention, the selectively sized and spaced holes progressively increase in diameter along the length of the pipe.

In accordance with another aspect of the invention, the selectively sized and spaced holes extend partially around the circumference of the hollow pipe.

In accordance with yet another aspect of the present invention, the selectively sized and spaced holes form a substantially v-shaped pattern along the length of the pipe.

In accordance with yet another aspect of the present invention, the length of the pipe is located substantially horizontal in the fluid body, and the v-shaped pattern substantially faces the bottom surface of the fluid body.

In accordance with a further embodiment of the present invention, the length of the pipe is located substantially vertical in the fluid body.

According to the present invention, the foregoing and other objects and advantages are obtained by a method of dry hydrant straining with the aforementioned dry hydrant strainer comprising the steps of: placing the pipe in a fluid body; applying a predetermined suction to the suction end by a source of suction such that the fluid is drawn through the suction end, wherein a substantially uniform fluid flow rate develops through the holes located along the length of the pipe.

According to the present invention, the foregoing and other objects and advantages are obtained by a dry hydrant system using the aforementioned dry hydrant strainer, where the suction end of the dry hydrant strainer is in fluid communication with a piping system. The piping system includes an above ground unpressurized hydrant pipe. The unpressurized hydrant pipe includes a coupling adapted for connection to a fire service apparatus.

Still other objects and advantages of the present invention will become readily apparent to those skilled in the art from the following detailed description, wherein I have shown and described only the preferred embodiment of the invention. As will be realized, the invention is capable of other and different embodiments, and its several details are capable of modification in various obvious aspects, all without departing from the invention. Accordingly, the drawings and descriptions are to be regarded as illustrative in nature, and not restrictive.

DESCRIPTION OF THE DRAWINGS

Figure 1:
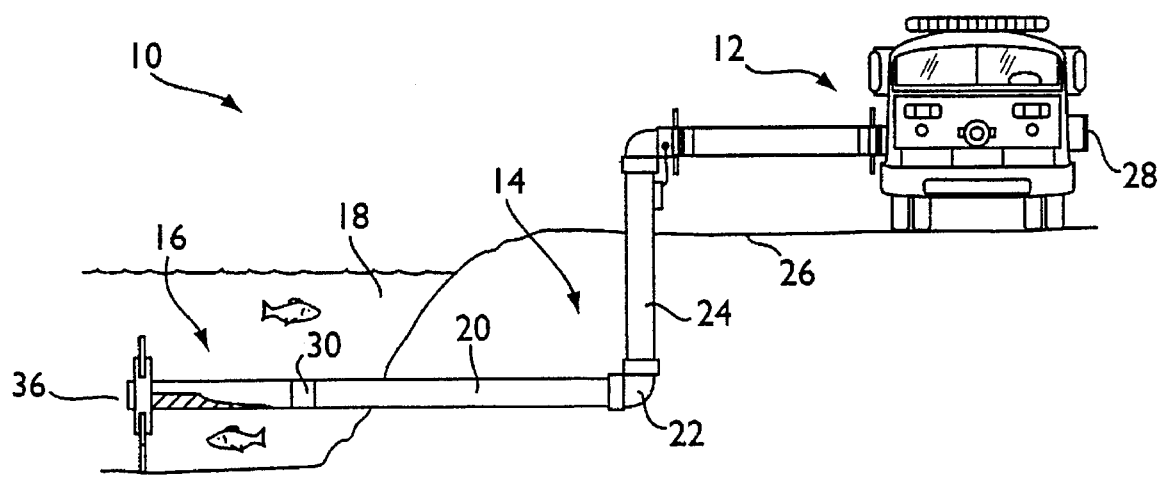
FIG. 1 is a side view of a dry hydrant incorporating features of the present invention.

A dry hydrant system (10) incorporating features of the present invention is depicted in FIG. 1, wherein piping (14) is partially submerged, and extends in a horizontal portion (20), in a fluid reservoir (18), and transitions through a right-angled portion (22), to a vertical portion (24) such that the piping (14) emerges through the ground (26) at a convenient location for use. In a preferred embodiment, the piping (14) is circular in cross-section, formed from polyvinylchloride (PVC), and comprises a plurality of pipe sections secured together at joints.

However, in alternative embodiments of the present invention, the piping may assume a variety of cross-sectional shapes, including but not limited to square, rectangular, ovaloid, hexagonal, or triangular. In alternative embodiments, the piping (14) may be formed from various types of plastics, metals, composites, or any combination thereof. Although in a preferred embodiment, the piping (14) comprises a number of pipe sections, in other embodiments, the piping (14) may be formed as a unitary structure, or may comprise any number of sections. In addition, the layout of the pipings (14) is not limited to the horizontal (20) and vertical (24) arrangement depicted in FIG. 1. It is understood that one skilled in the art may arrange the piping (14) in a manner that will efficiently transfer fluid from the reservoir (18) to a desired location in accordance with the unique features of the setting.

The piping (14) is normally in an unpressurized condition, thereby necessitating the use of suction pump (12) or some other form of suction means to pressurize the piping (14) in order for the dry hydrant system (10) to operate. In a preferred embodiment, as depicted in FIG. 1, the suction pump (12) is connected to the hydrant piping (14) at a location that makes the suction pump (12) convenient to use, in this case, above ground (26) near the reservoir (18). The suction pump (12), in turn, has an outlet (28) through which a hose (not shown) or any other fluid delivery device may be attached to deliver fluid to an intended target.

In the embodiment of the dry hydrant system (10) depicted in FIG. 1, a fire truck carrying a suction pump (12) provides pressurization to the piping (14). However, in alternative embodiments, any type of conventional pump, suction device, or any other means for producing a pressure differential may be used in conjunction with the dry hydrant system (10). These pumps may be mechanically, manually, or electrically operated, including combinations thereof. In a preferred embodiment, the suction pump (12) is also capable of reversing the fluid flow in order to backflush the piping (14) and strainer (16).

Although in a preferred embodiment, the suction pump (12) is located above ground (26) near the reservoir (18), in alternative embodiments, the suction pump (12) may be disposed at any convenient location, including but not limited to, any location along the lengths of piping 14. The only requirement is that the pump selected have the ability to produce a pressure differential great enough to draft the fluid from the reservoir (18), and deliver the fluid at a sufficient pressure at an outlet. In alternative embodiments, multiple mumps may be used to achieve the desired pressure differential, or in addition, to deliver the fluid to a plurality of piping branches leading to a plurality of outlets.

As depicted in FIG. 1, the portion of the piping (14) that is submerged in the reservoir (18) terminates with a fluid inlet (30). It is through the fluid inlet (30) that the reservoir fluid enters the piping (14) when the fluid is subjected to pressure differentials produced by the suction pump (12). Connected to the fluid inlet (30) is the dry hydrant strainer (16).

In a preferred embodiment, the strainer (16) is a pipe with a circular cross-section, and is oriented horizontally with the horizontal portion (20) of the piping (14). The strainer (16) is substantially capped at a first end (34) with a hemispherical cap (36), and is connected to the fluid inlet (30) at a second end (38).

In alternative embodiments of the present invention, the strainer (16) may be formed from inlet members having a variety of cross-sectional shapes. Although in a preferred embodiment, the cap (36) is a separate element and hemispherical in shape, in alternative embodiments, any means for capping the first end (34) of the strainer (16) may be used, including welding or screwing on caps of various shapes and materials, or even forming a cap which is unitary with the inlet member. In addition, the cap (36) does not necessarily have to completely cap the first end (34), since in a preferred embodiment, a plurality of apertures (32') are formed in the cap (36) in order to allow some fluid flow through the cap. The first end (38) of the strainer (16) may be connected to the inlet (30) of the piping (14) using conventional means known in the art for joining two such sections.

Figure 2:
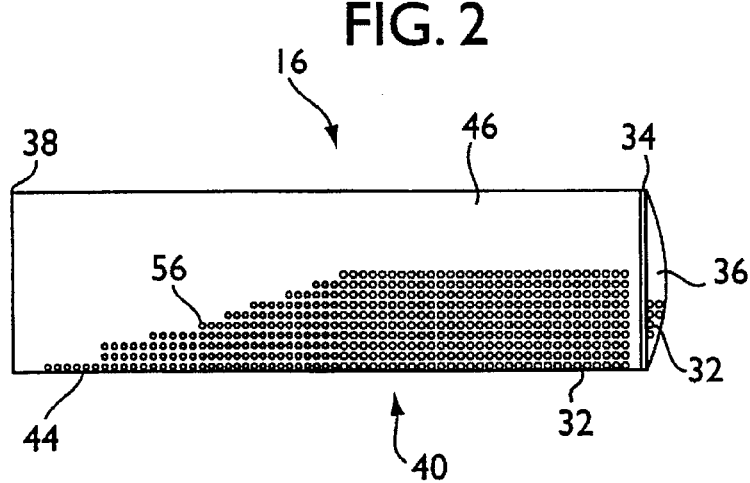
FIG. 2 is a side view of the dry hydrant strainer of FIG. 1
Figure 3:
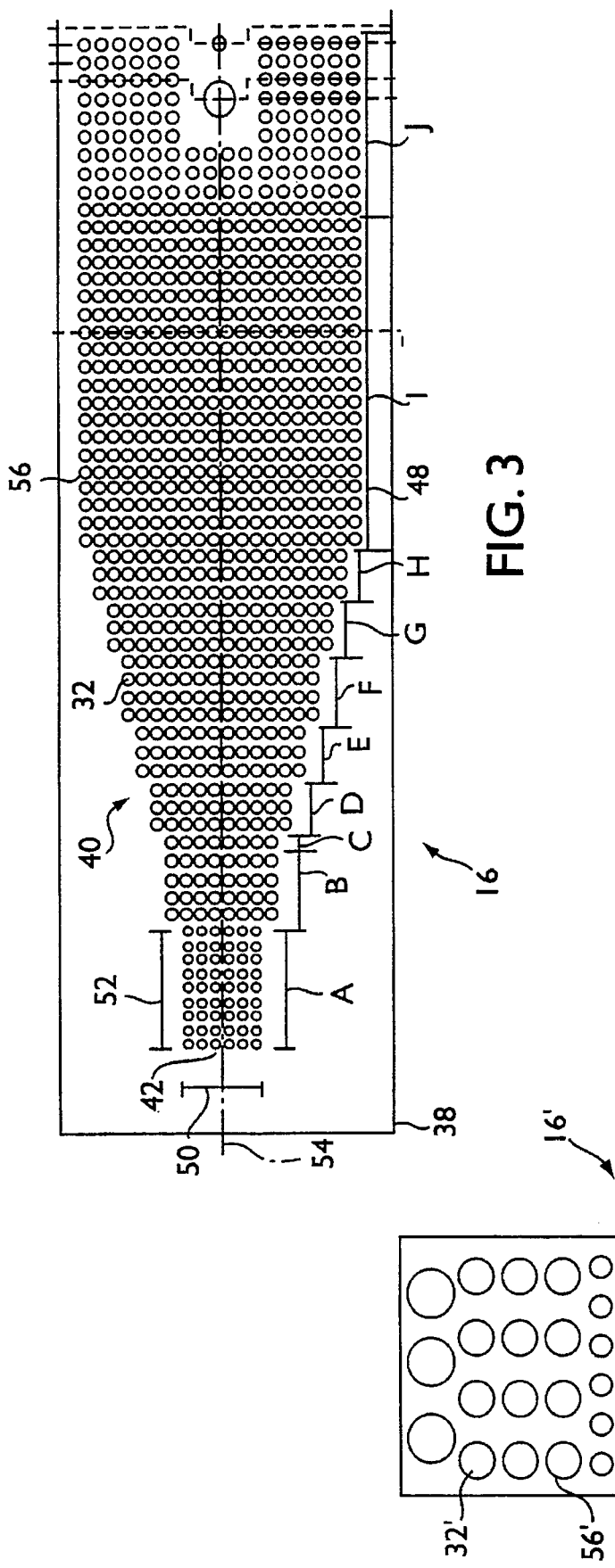
FIG. 3 is a flat plan view of the dry hydrant strainer of FIG. 2, depicting the pattern of apertures in the strainer.

As depicted in FIGS. 2 and 3, the strainer (16) contains a plurality of apertures (32) with diameters that are sized, in general, such that fluid may pass through each aperture (32), but which are small enough to prevent various types of debris from entering the fluid inlet (30), thus serving as a "strainer". The apertures (32) may be formed by boring through the strainer (16), or may be formed during the manufacture of the strainer (16) itself (e.g., injection molding).

In a preferred embodiment of the present invention, the apertures (32) form a v-shaped pattern (40) in the strainer (16) such that the apex (42) of the v-shaped pattern (40) is spaced proximal to the second end of the strainer (16). The v-shaped pattern (40) is disposed substantially on the underside (44) of the strainer (16). The absence of the apertures (32) from the upper-side (46) of the strainer (16) is necessary to conform with the safety requirements mandated by the National Fire Protection Association (or to conform with other applicable governmental and/or industry standards) in order to prevent the possibility of whirlpools forming near the strainer (16).

As depicted in FIG. 3, the v-shaped pattern (40) further comprises a plurality of aperture groupings (48), wherein the layout of apertures (32) in each grouping (48) defines a height dimension (50) and width dimension (52) that is consistent within that grouping (48). To form the v-shaped pattern (40), the groupings (48) are centered about the longitudinal axis (54) of the strainer (16) and extend to the second end (38) of the strainer. The juxtaposition of the groupings (48) having these descending heights roughly forms the desired v-shaped pattern (40). In addition, apertures (32') may be disposed about the strainer cap (36), if necessary, to provide for extra fluid entry. As will be noted later, the height (50) and width (52) of each grouping (48), and the number of groupings (48), may depend on characteristics unique to various dry hydrant systems and surroundings.

In addition, the diameters (56) of the apertures (32) are preferably substantially consistent within each grouping (48), but are not necessarily consistent from one grouping (48) to another. The apertures (32) in groupings (48) near the first end (34) of the strainer (16) have aperture diameters (56) that are greater than those apertures (32) near the second end (38) of the strainer (16). Specifically, as depicted in the embodiment of FIG. 3, grouping A has aperture diameters (56) that are smaller than grouping B, and grouping B has aperture diameters (56) that are smaller than grouping C, but groupings D-H have diameters that are consistent. As will be noted below, the diameters (56) of the apertures (32) in each grouping (38) are dictated by some of the same factors that help determine the height (50) and width (52) of each grouping.

In operation, the disposition of the apertures (32) in the v-shaped pattern (40), plus the use of apertures (32) of differing diameters (56), combine to provide uniform suction throughout the strainer 16. Otherwise, when the suction pump (12) is activated, the suction force near the second end (38) of the strainer (16), acting through a constant rectangular pattern of holes, would cause fluid to be drafted near the second end (38) of the strainer (16) at a rate greater than the fluid drafted at the first end (34). This drafting imbalance causes uneven fluid flow about the strainer (16) and may result in a whirlpool forming, thereby reducing the effectiveness of the entire dry hydrant system 10.

In the present invention, the layout of the apertures (32) in the v-shaped pattern (40) coupled with the use of apertures (32) of varying diameters (56), results in an even distribution of suction forces throughout the strainer (16), thereby delivering continuous fluid flow into the fluid inlet (30). As is known in the art of fluid dynamics, there is a mathematical relationship (i.e., Bernoulli's Equation) between force applied to a fluid, fluid velocity, and cross-sectional area. Using that relationship, since the suction force at the second end (38) of the strainer (16) is greater than the suction force at the first end (34), then in order to ensure that the velocity of the fluid entering the strainer (16) is uniform over the length of the strainer (16) according to this mathematical relationship, the cross-sectional area of openings in the strainer (16) along the longitudinal axis (54) of the strainer (16) must be greater near the first end (34) than the second end (38) of the strainer (16). In the present invention, this cross-sectional area of the openings in the strainer (16) is achieved by varying the diameters (56) of the apertures (32) in each grouping (48), the number of apertures (32) in each grouping (48), and the height (50) and width (52) of each grouping (48).

As will be apparent to one skilled in the art, the layout of the v-shaped pattern (40), and the diameters (56) of the apertures (32) depend on a variety of factors, including, but not limited to, the suction force created by the pump 12, the force generated at the fluid inlet (30), the length and cross-sectional area of the strainer (16), the density of the fluid being pumped, and the desired velocity of the fluid entering the inlet (30).

For exemplary purposes, the following table provides aperture diameters (56) and dimensions related to the groupings (48) in the v-shaped pattern (40) for one embodiment of the present invention as depicted in FIG. 3.

| Grouping | # Columns | # Rows | Diameter | Aperture Spacing |
| --- | --- | --- | --- | --- |
| A | 10 | 6 | 0.25" | 0.5" |
| B | 4 | 8 | 0.3125 | 0.5 |
| C | 1 | 8 | 0.375 | N/A |
| D | 3 | 10 | 0.375 | 0.625 |
| E | 3 | 12 | 0.375 | 0.625 |
| F | 4 | 14 | 0.375 | 0.625 |
| G | 3 | 16 | 0.375 | 0.625 |
| H | 3 | 18 | 0.375 | 0.625 |
| I | 20 | 20 | 0.4375 | 0.625 |
| J | 9 | 16 | 0.5 | 0.625 |

The strainer (16) embodying features of the present invention provides for many advantages over the prior art. The uniform suction and fluid flows associated with the strainer (16) reduces the reservoir depth necessary above the strainer (16) by one foot. In addition, the depth of the reservoir necessary to use the strainer is reduced by half a foot. Therefore, a strainer (16) embodying features of the present invention may be used in fluid reservoirs having depths that might have prevented use of the prior art strainer.

Figure 4:
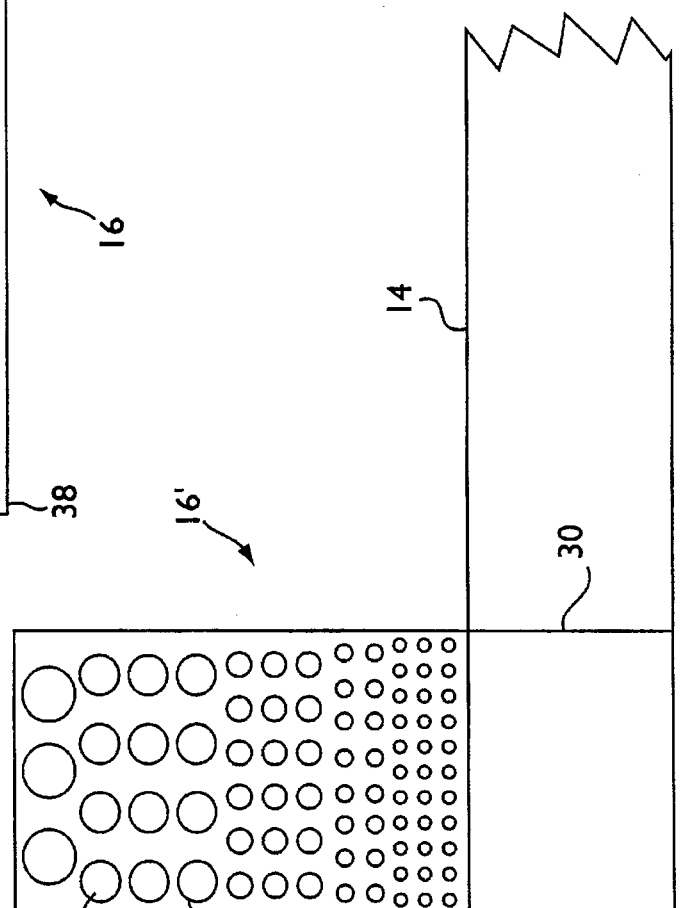
FIG. 4 is a side view of an alternative embodiment of the dry hydrant strainer.

In another embodiment of the present invention, as depicted in FIG. 4, the strainer (16') is oriented in a vertical position. In this embodiment, the apertures (32') are not disposed in a v-shaped pattern, but rather, are disposed continuously about the outer surface of the strainer (16'). However, as with the preferred embodiment, the apertures (32') spaced proximal to the fluid inlet (30) have diameters (56') that are smaller than the diameters (56') of the apertures (32') spaced distal from the fluid inlet (30).

In alternative embodiments of the present invention, strainers embodying features of the present invention may contain the v-shaped pattern and have apertures of consistent diameters, may not have the v-shaped pattern but have apertures of inconsistent diameters, or may have a combination of the v-shaped pattern and inconsistent diameters. In addition, alternative embodiments are not limited to a horizontal or vertical orientation of the strainer. In these embodiments, the strainer may also be positioned at various angles to improve fluid flow.

It will be readily seen by one of ordinary skill in the art that the present invention fulfills all the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

I claim:

1. A method for drafting fluid from a fluid reservoir using a dry hydrant, said dry hydrant comprising:

suction means for producing suction;

an inlet member having a first end and a second end, said first end being substantially capped, said second end being connected to said suction means, said inlet member having a plurality of apertures disposed between said first end and said second end, said apertures being disposed in a substantially v-shaped pattern, whereby an apex of said substantially v-shaped pattern is spaced proximal to said second end; and an outlet connected to said suction means;

said method for drafting fluid comprising the steps of:

(a) submerging said inlet member within said fluid reservoir;

(b) connecting delivery means to said outlet, whereby said delivery means is capable of delivering said fluid to an intended target; and (c) activating said suction means, whereby upon said activating of said suction means, said suction means draws fluid from said fluid reservoir and urges said fluid through said outlet and said delivery means, and whereby said apertures in said inlet member provide a uniform suction zone throughout said inlet member and provide uniform drafting flow.

2. A method for drafting fluid, as claimed in claim 1, wherein said apertures spaced proximal to said first end of said inlet member have diameters greater than diameters of said apertures spaced proximal to said second end of said inlet member.

3. A method for drafting fluid from a fluid reservoir using a dry hydrant, said dry hydrant comprising:

suction means for producing suction;

an inlet member having a first end and a second end, said first end being substantially capped, said second end being connected to said suction means, said inlet member having a plurality of apertures disposed between said first end and said second end, said apertures spaced proximal to said first end of said inlet member having diameters greater than diameters of said apertures spaced proximal to said second end of said inlet member; and an outlet connected to said suction means;

said method for drafting a fluid comprising the steps of:

(a) submerging said inlet member within said fluid reservoir;

(b) connecting delivery means to said outlet, whereby said delivery means is capable of delivering said fluid to an intended target; and (c) activating said suction means, whereby upon said activating of said suction means, said suction means draws fluid from said fluid reservoir and urges said fluid through said outlet and said delivery means, and whereby said apertures in said inlet member provide a uniform suction zone throughout said inlet member and provide uniform drafting flow.

4. A system for drafting fluid, as claimed in claim 3, wherein said apertures in said inlet member are disposed in a substantially v-shaped pattern, whereby an apex of said substantially v-shaped pattern is spaced proximal to said second end of said inlet member.

5. A strainer for use with a dry hydrant, said dry hydrant having an inlet, said strainer comprising:

(a) an inlet member having a first end and a second end, said first end being substantially capped, said second end being connected to said dry hydrant inlet; and (b) a plurality of apertures in said inlet member disposed between said first end and said second end, said apertures being disposed in a substantially v-shaped pattern, whereby an apex of said substantially v-shaped pattern is spaced proximal to said second end.

6. A strainer as claimed in claim 5, wherein said apertures spaced proximal to said first end of said inlet member have diameters greater than diameters of said apertures spaced proximal to said second end of said inlet member.

7. A strainer for use with a dry hydrant, said dry hydrant having an inlet connected to suction means for producing suction, said strainer comprising:

(a) an inlet member having a first end and a second end, said first end being substantially capped, said second end being connected to said dry hydrant inlet; and (b) a plurality of apertures in said inlet member disposed between said first end and second end, said apertures spaced proximal to said first end of said inlet member having diameters greater than diameters of said apertures spaced proximal to said second end of said inlet member, whereby said differences in diameters provides a uniform suction zone throughout said inlet member.

8. A strainer as claimed in claim 7, wherein said apertures in said inlet member are disposed in a substantially v-shaped pattern, whereby an apex of said substantially v-shaped pattern is spaced proximal to said second end of said inlet member.

* * * * *